United States Patent
Ostashev

(10) Patent No.: US 10,816,435 B2
(45) Date of Patent: Oct. 27, 2020

(54) MULTI-DIRECTIONAL WATER SENSOR WITH ALARM

(71) Applicant: Glentronics, Inc., Lincolnshire, IL (US)

(72) Inventor: Ilya Ostashev, Lincolnshire, IL (US)

(73) Assignee: GLENTRONICS, INC., Lincolnshire, IL (US)

( * ) Notice: Subject to any disclaimer, the term of this patent is extended or adjusted under 35 U.S.C. 154(b) by 0 days.

(21) Appl. No.: 16/510,537

(22) Filed: Jul. 12, 2019

(65) Prior Publication Data

US 2020/0018665 A1 Jan. 16, 2020

Related U.S. Application Data

(63) Continuation-in-part of application No. 16/036,602, filed on Jul. 16, 2018.

(51) Int. Cl.
*G08B 21/20* (2006.01)
*G01M 3/40* (2006.01)
*G08B 3/10* (2006.01)

(52) U.S. Cl.
CPC ............. *G01M 3/40* (2013.01); *G08B 3/10* (2013.01); *G08B 21/20* (2013.01)

(58) Field of Classification Search
CPC .......... G01N 27/07; G08B 21/20; G08B 3/10; G01M 3/40
USPC ....................................... 324/693
See application file for complete search history.

(56) References Cited

U.S. PATENT DOCUMENTS

| 4,227,190 A | 10/1980 | Kelley |
| 4,264,902 A | 4/1981 | Miller |
| 4,845,472 A | 7/1989 | Gordon |
| 5,091,715 A | 2/1992 | Murphy |
| 5,272,467 A | 12/1993 | Krauleidies |
| 5,757,197 A | 5/1998 | O'Neill |
| 6,683,535 B1 * | 1/2004 | Utke ............. G01M 3/045 200/61.04 |
| 6,690,281 B2 | 2/2004 | Palmer |
| 8,970,385 B1 | 3/2015 | Brooking |
| 8,970,386 B2 | 3/2015 | Scharf |
| 2011/0291845 A1 | 12/2011 | Rice |
| 2013/0069675 A1 | 3/2013 | Woloszyk |
| 2018/0233022 A1 * | 8/2018 | Nguyen ............. G08B 21/20 |
| 2019/0094097 A1 * | 3/2019 | Cavalheiro .......... G08B 21/20 |
| 2019/0339153 A1 | 11/2019 | Jung |

FOREIGN PATENT DOCUMENTS

DE 102016013754 A1 5/2018

OTHER PUBLICATIONS

Extended European Search Report for Application No. EP 19186455.2, dated Dec. 13, 2019 (6 pages).

* cited by examiner

*Primary Examiner* — Reena Aurora
(74) *Attorney, Agent, or Firm* — Nixon Peabody LLP

(57) ABSTRACT

A multi-directional water sensor comprises a housing having multiple conductive pads on the outer surface of the housing at locations spaced around the periphery of the housing, an electrical power source located inside the housing, a buzzer located inside the housing, and multiple electrical conductors located inside the housing and connecting multiple pairs of the contacts so that electrical current can flow between different pairs of the contacts when they are connected by water. The buzzer produces a sound when electrical current flows between any pair of the contacts.

20 Claims, 13 Drawing Sheets

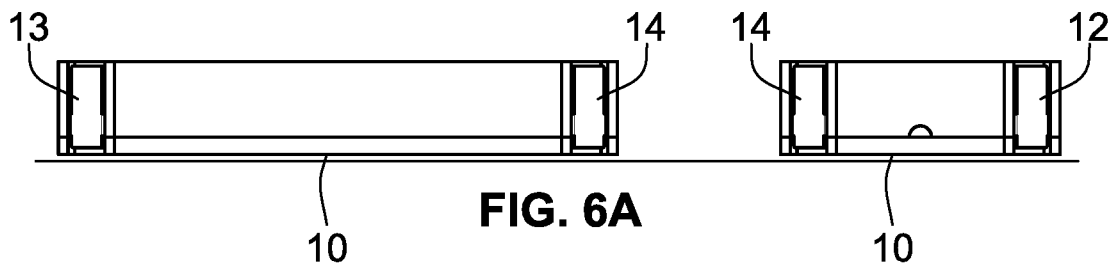
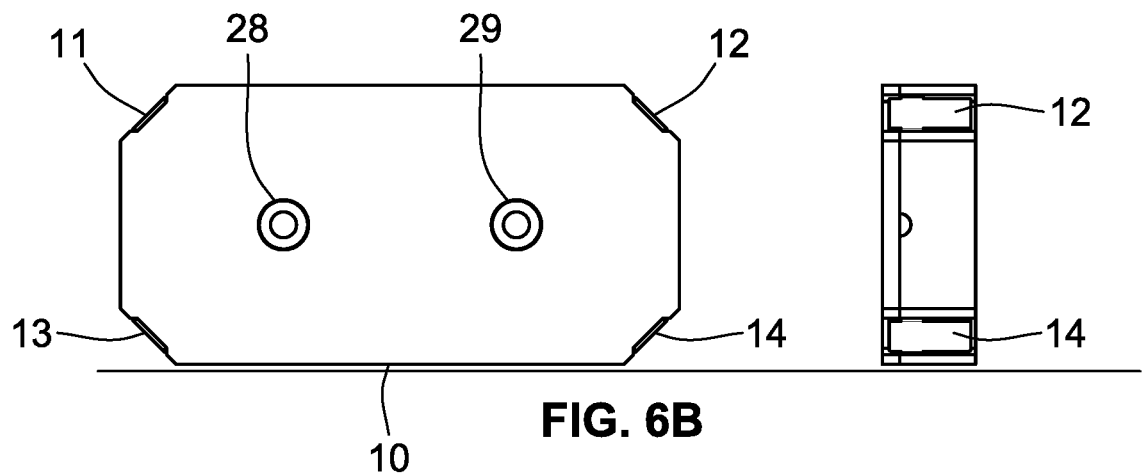
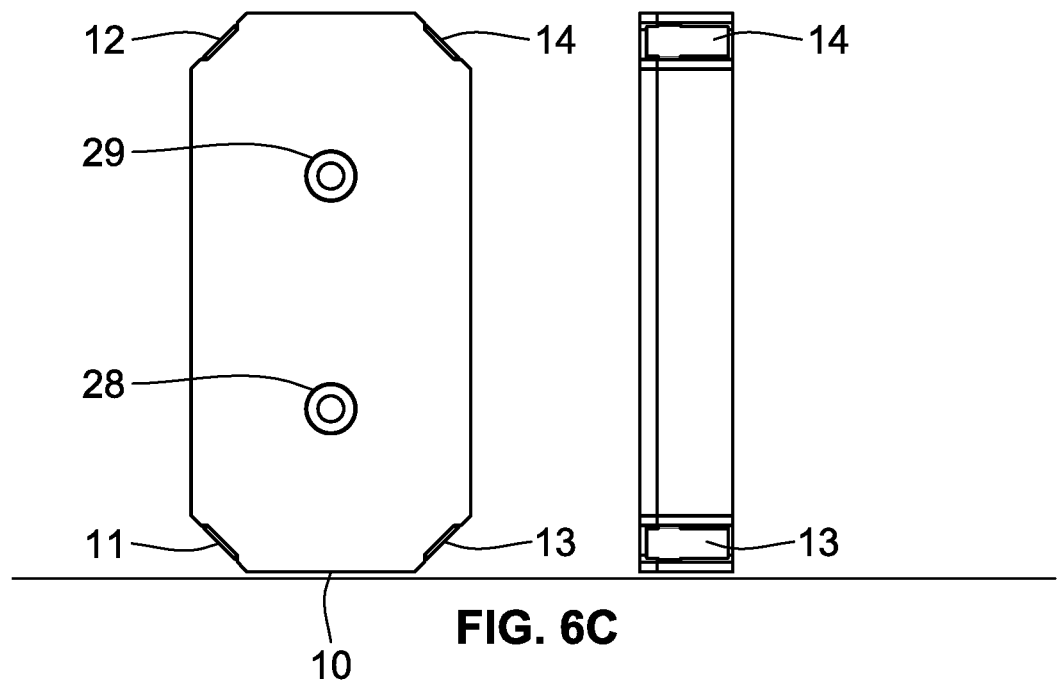

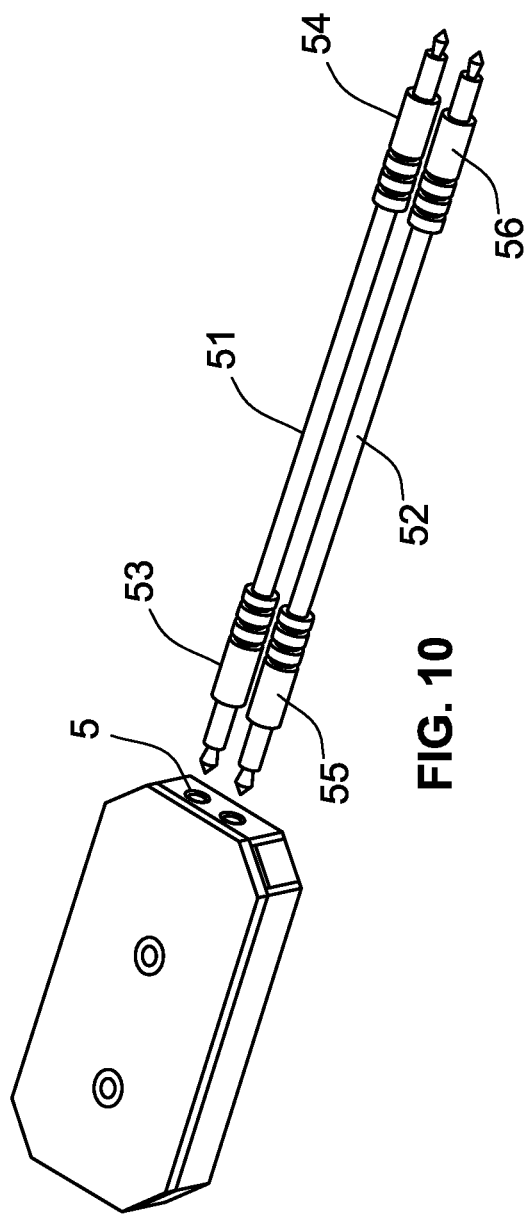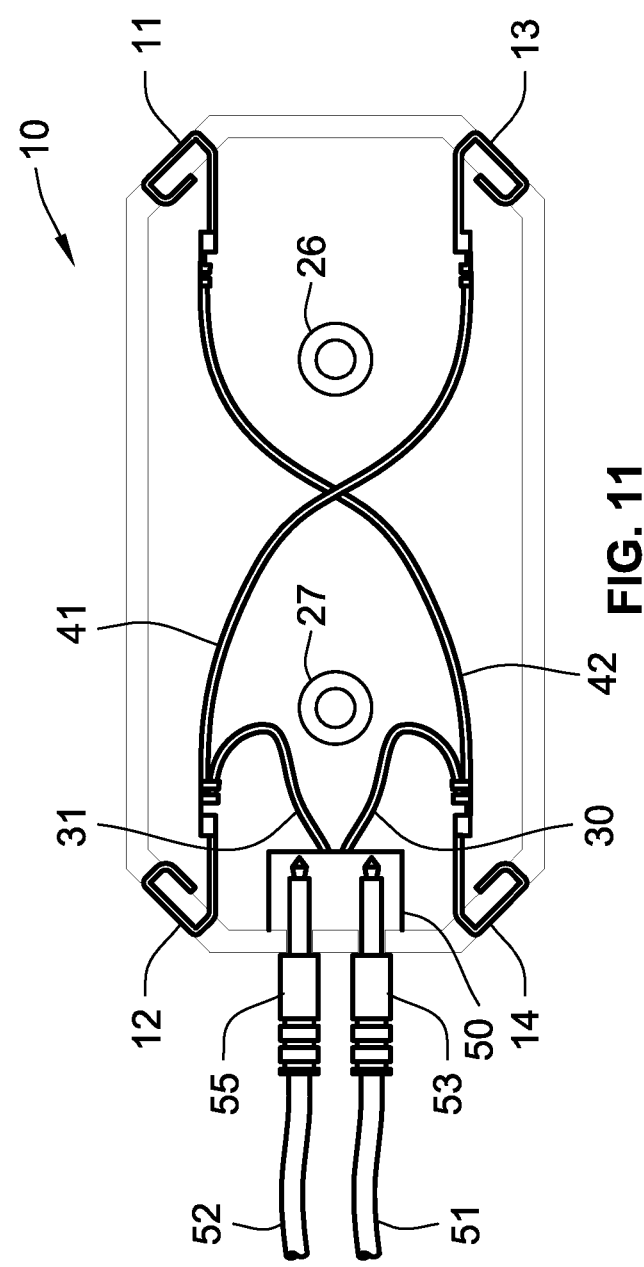

MULTI-DIRECTIONAL WATER SENSOR WITH ALARM

CROSS-REFERENCE TO RELATED APPLICATIONS

This patent application is a continuation-in-part of U.S. patent application Ser. No. 16/036,602, filed on Jul. 16, 2018, which is incorporated herein by reference in its entirety.

FIELD

Embodiments of the disclosure relate generally to multi-directional water sensors that detect water from any direction so that water can be reliably detected regardless of the orientation of the sensors. This enables the sensor to be located in a wide variety of different spaces of different sizes and shapes.

BACKGROUND

Water sensors or sensors are used to detect water leaks by sensing the presence of water in contact with two spaced conductive pads. If water comes into contact with both conductive pads, an audible alarm is sounded to warn the user that water is present in the location of the sensor. Such water sensors are typically placed under sinks or in areas where major appliances are located, such as in a laundry room.

BRIEF SUMMARY

An embodiment of the disclosure provides a multi-directional water sensor comprising a housing having an outer surface with multiple conductive pads, an electrical power source located inside the housing, and multiple electrical conductors located inside the housing and connecting the multiple conductive pads to form at least two distinct groupings of the multiple conductive pads. The at least two distinct groupings of the multiple conductive pads are spaced around the outer surface of the housing such that electrical current from the electrical power source can flow between a first grouping of the at least two distinct groupings of the multiple conductive pads and a second grouping of the at least two distinct groupings of the multiple conductive pads in response to being electrically connected by a thin layer of surface water. The multi-directional water sensor further comprises a buzzer located inside the housing and coupled to the electrical power source. The buzzer is configured to generate a sound in response to the first grouping being electrically connected to the second grouping via the thin layer of surface water.

An embodiment of the disclosure provides a method for sensing water comprising monitoring, by a biasing circuit of a multi-directional water sensor, a resistance between at least two distinct groupings of multiple conductive pads. The at least two distinct groupings of the multiple conductive pads are spaced around an outer surface of a housing of the multi-directional water sensor such that a low resistance is sensed when a first grouping of the at least two distinct groupings of the multiple conductive pads and a second grouping of the at least two distinct groupings of the multiple conductive pads are electrically connected by a thin layer of surface water, and a high resistance is sensed when the first grouping and the second grouping are not connected by the thin layer of surface water. The biasing circuit of a multi-directional water sensor is configured such that no power is drawn from an electrical power source of the multi-directional water sensor while sensing a high resistance between the at least two distinct groupings of the multiple conductive pads. The biasing circuit of the multi-directional water sensor provides power to a buzzer of the multi-directional water sensor in response to determining that a low resistance exists between the at least two distinct groupings of the multiple conductive pads.

BRIEF DESCRIPTION OF THE DRAWINGS

FIG. 6A is a pair of side and end elevations of the water sensor of FIG. 1

FIG. 6B is a pair of top and end elevations of the water sensor of FIG. 1, with the cover plate removed.

FIG. 6C is a pair of side and end elevations of the water sensor of FIG. 1.

FIG. 10 is a perspective view of a modified water sensor having one end adapted to receive a pair of plug-in cables.

FIG. 11 is a cross-section of the modified water sensor shown in FIG. 10.

DETAILED DESCRIPTION

Figure 1:
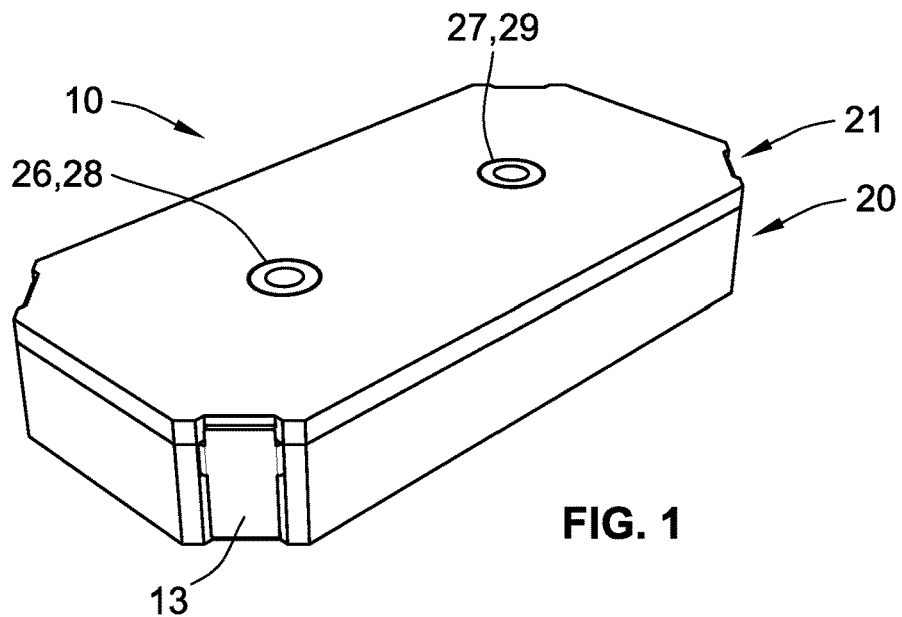
FIG. 1 is a top perspective view from one corner of a water sensor according to an embodiment of the disclosure.
Figure 2:
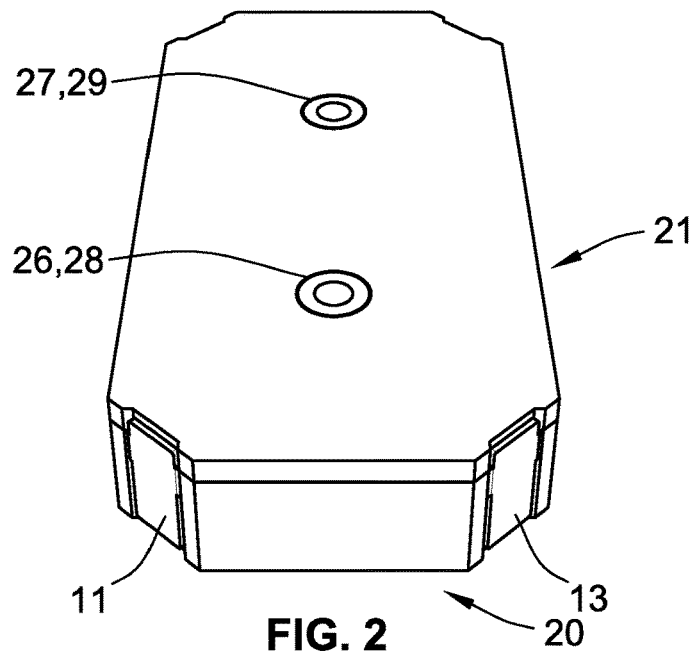
FIG. 2 is a top perspective view from one end of the water sensor shown in FIG. 1.
Figure 3:
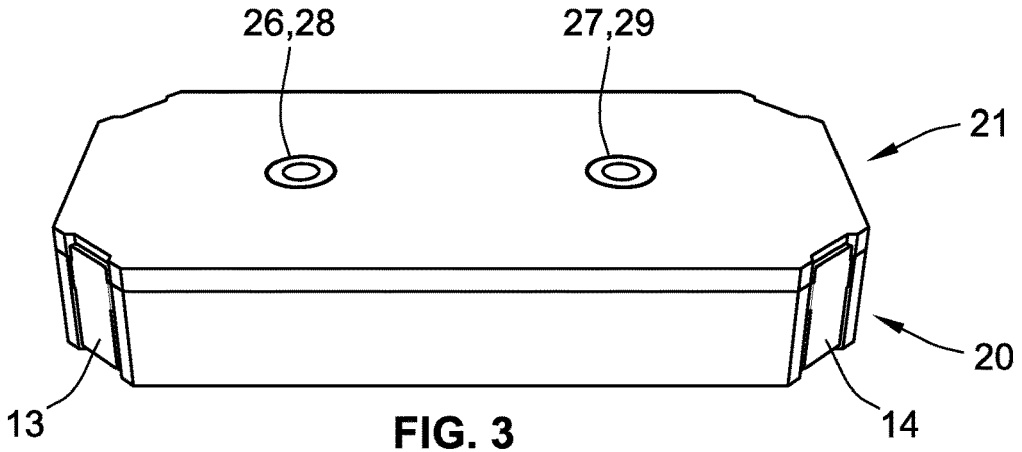
FIG. 3 is a top perspective view from one side of the water sensor shown in FIG. 1.

In the drawings, FIGS. 1-5 illustrate a multi-directional water sensor that has a rectangular housing 10 with four truncated corners, each of which includes one of four electrically conductive pads 11-14. The main body portion of the housing 10 is made of a non-conductive material, such as a molded polymeric material. An electrical cable 15 connects circuitry inside the housing 10 to an alarm device that produces an alarm sound and/or signal when water contacts any two of the conductive pads 11-14 and thus completes an electrical circuit. One example of a suitable alarm device is the "Pro Series Water Alarm" available from Glentronics Inc.

In the illustrative embodiment, the housing 10 includes a base member 20 and a lid 21 that has a peripheral depending flange 23 that fits flush against the top surface 24 of the peripheral side walls of the base member 20, as shown in FIGS. 1-3 and 5. The lid 21 includes a pair of integral pins 25a and 25b that depend from the bottom surface of the lid 21 and engage the bottom wall of the base member 20 when the housing 10 is assembled. The base member 20 includes a pair of integral posts 26 and 27 that fit into apertures 28 and 29 in the lid 21 when the base member 20 and lid 21 are assembled.

Figure 4A:
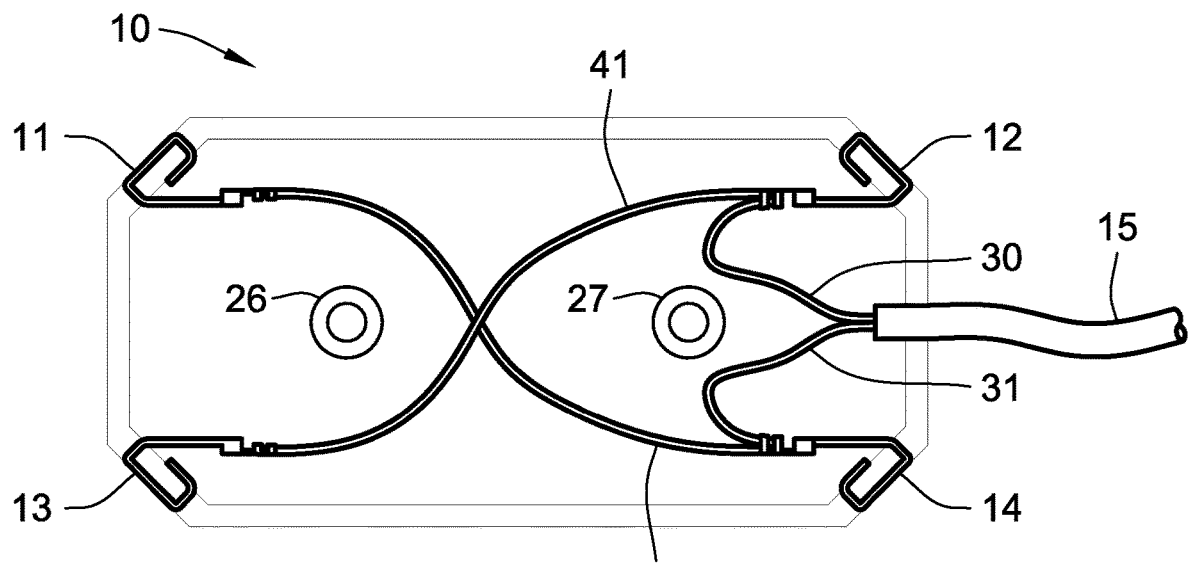
FIG. 4A is a top plan view of the water sensor shown in FIG. 1 with the lid removed.
Figure 4B:
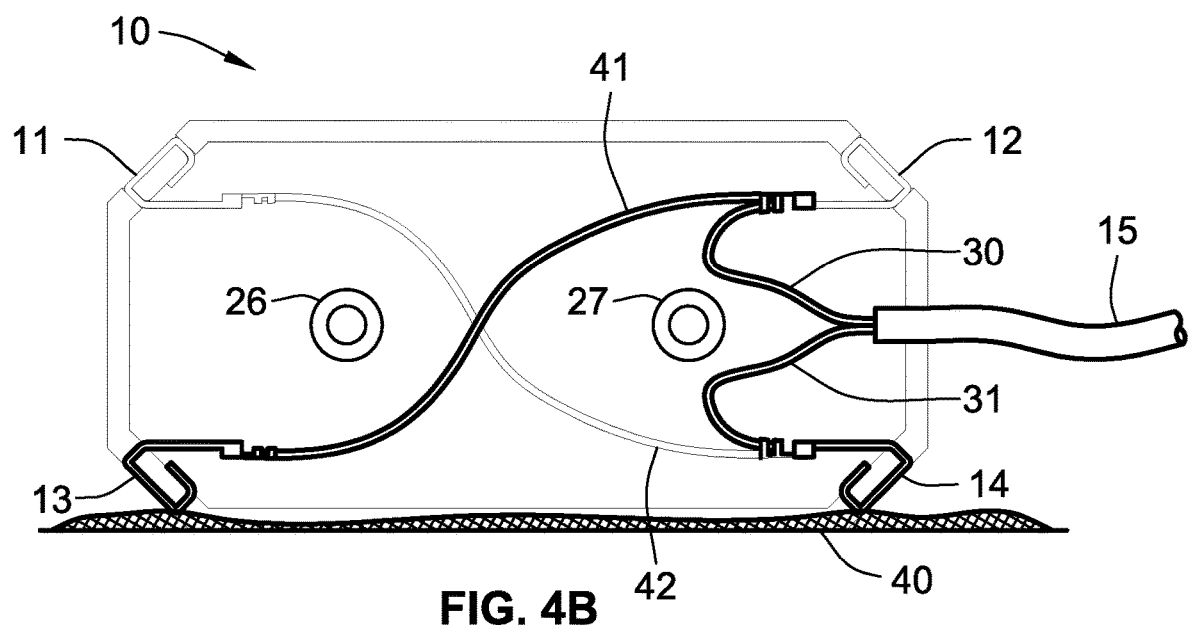
FIG. 4B is the same top plan view shown in FIG. 4A with water contacting one side of the water sensor.

FIGS. 4A and 4B are cross-sections of the water detector 10 shown in FIG. 1, showing the electrical circuitry inside the housing 10 for connecting the conductive pads 11-14 to the cable 15. Each of the conductive pads 11-14 extends diagonally across a corner of the housing 10, at an angle of 135 degrees to the adjacent side walls of the housing. As can be seen in FIGS. 4A and 4B, this angular orientation of the conductive pads 11-14 ensures that a conductive pad will be contacted by water passing along a housing side wall on either side of one of the pads 11-14. For example, in FIG. 4B water 40 is passing along the housing sidewall extending between the pads 13 and 14 of the housing 10. Both conductive pads 13 and 14 are contacted by the water 40, so electrical current can flow between pads 13 and 14. This causes current to flow from the cable 15 through conductors 30 and 41 to the pad 13, and then through the water 40 from pad 13 to pad 14. This current continues through the cable 15 to the alarm device, which produces an alert signal indicating that water is present in the location of the housing 10, so that remedial action can be taken. Only a small amount of electrical current, e.g., 2.2 µA, is needed to activate the alarm device.

It can be seen from FIGS. 4A and 4B that any given pair of conductive pads located at opposite ends of any of the four side walls of the housing 10 will be electrically connected to both wires of the cable 15 if water is present to connect that pair of pads.

Figure 5:
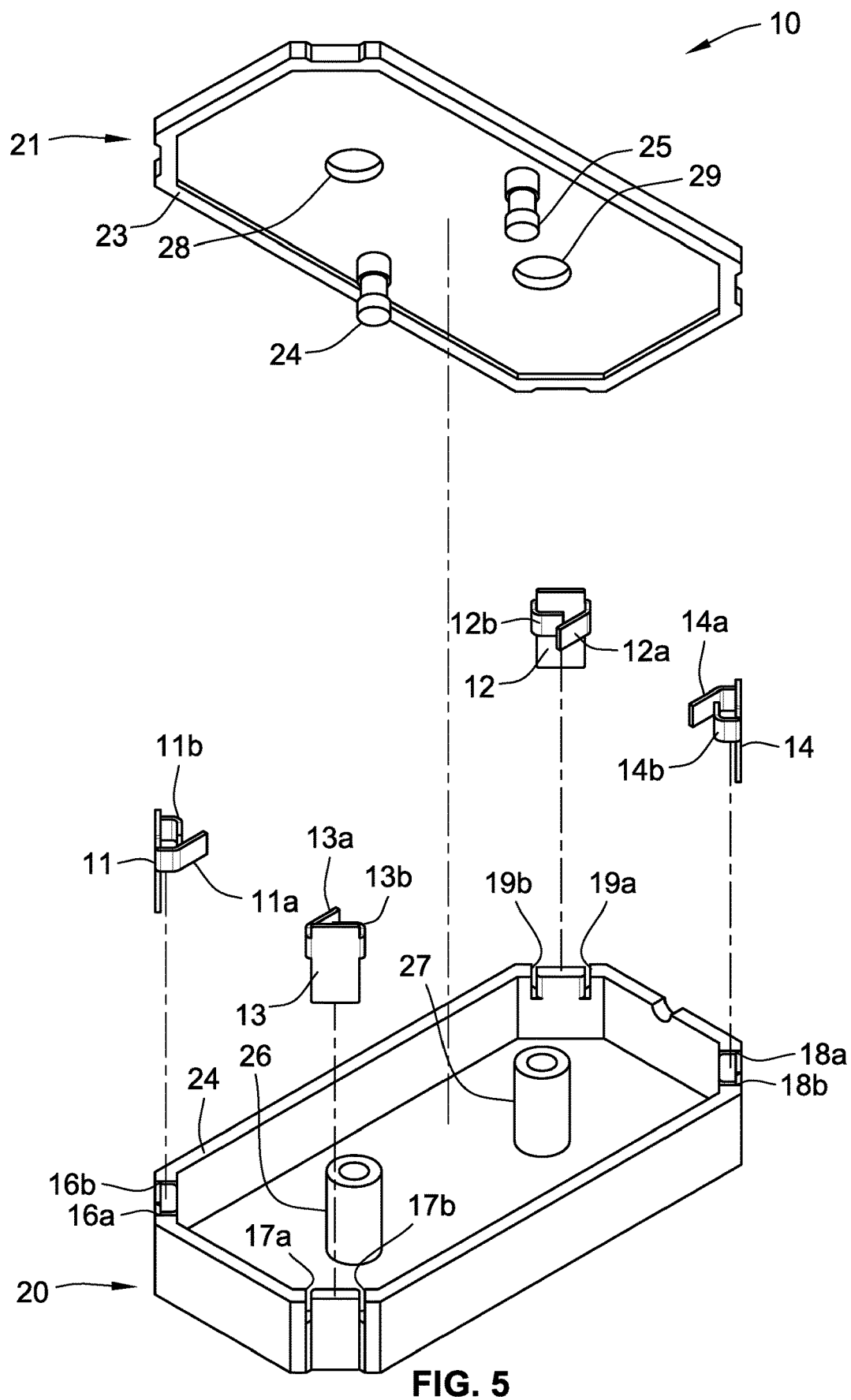
FIG. 5 is a top perspective view of the water sensor of FIG. 1, with the cover plate removed, according to an embodiment of the disclosure.

FIG. 5 illustrates one preferred structure of the conductive pads 11-14 to facilitate attaching the pads to the corners of the housing 10. Each of the pads 11-14 includes a pair of tabs 11a, 11b or 12a, 12b or 13a, 13b or 14a, 14b extending laterally from opposite side edges of the tabs. The projecting tabs of each pad fit into matching slots 16a, 16b or 17a, 17b or 18a, 18b or 19a, 19b in the truncated corners of the housing 10. The tabs 11b-14b are bent tightly around the respective truncated corners of the housing 10 to clamp the pads 11-14 tightly in place on the housing 10. Tabs 11a-14a are longer than tabs 11b-14b and are bent at only a 45-degree angle to facilitate connecting these tabs to the wires 30, 31, 41 and 42, which may be connected by soldering or by the use of conventional connectors such as "Faston" connectors. In an embodiment, instead of having tabs on each side of the pads 11-14, both tabs are provided on a single side, that is, tabs 11a-14a and tabs 11b-14b can be provided on a single same side with tabs 11a-14a positioned above tabs 11b-14b.

Figure 7:
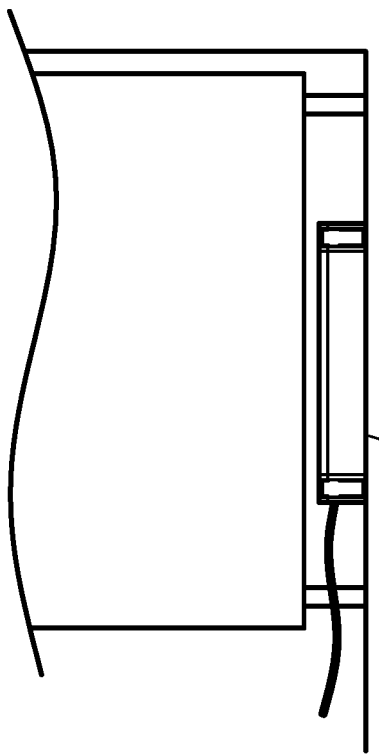
FIG. 7 is a fragmentary elevation of an appliance having the water sensor of FIG. 1 located beneath the bottom wall of the appliance.
Figure 8:
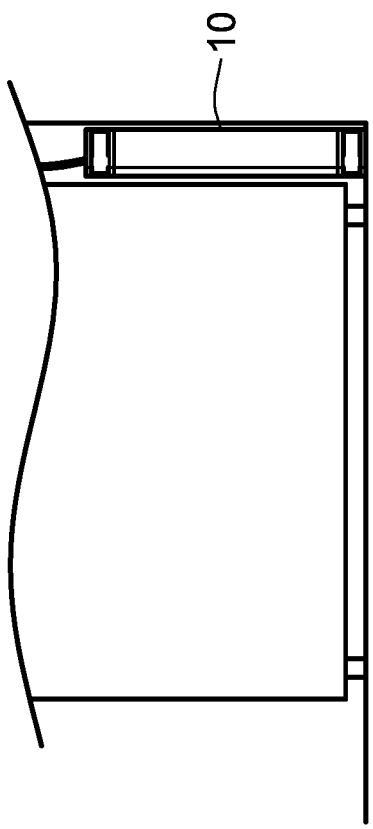
FIG. 8 is a fragmentary elevation of an appliance having the water sensor of FIG. 1 located adjacent the rear wall of the appliance.
Figure 9:
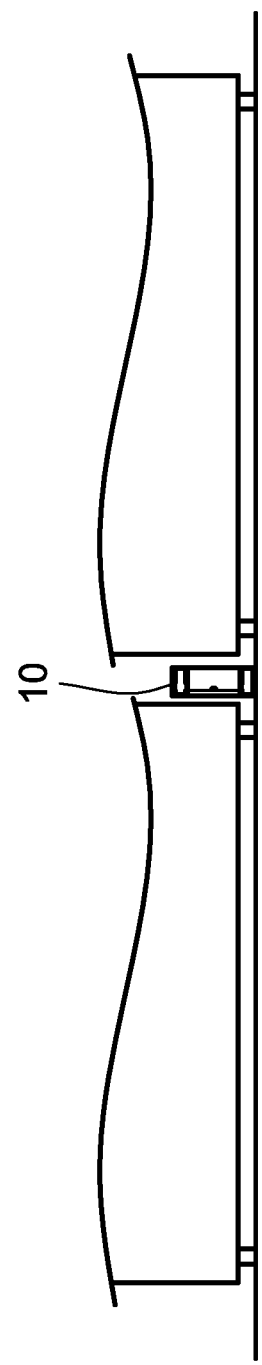
FIG. 9 is a fragmentary elevation of an appliance having the water sensor of FIG. 1 located between the side walls of two adjacent appliances.

The angled corner arrangement of the pads 11-14 permits the housing 10 to be positioned in a variety of different orientations on a surface where the presence of water is to be detected, as illustrated in FIGS. 6A-6C. The pads 11-14 can be located a predetermined distance above the floor when the housing 10 is resting on the floor, to allow moisture or a very thin layer of water to be present on the floor without triggering an electrical connection between the sensors. For example, the predetermined distance can be ⅟₃₂". In FIG. 6A the housing 10 rests on its bottom wall 30, in FIG. 6B the housing 10 rests on a side wall 31, and in FIG. 6C the housing 10 rests on an end wall 32. These different options enable the housing 10 to be positioned in a wide variety of different locations, such as beneath a major appliance as illustrated in FIG. 7, between an appliance and a wall as illustrated in FIG. 8, or between a pair of closely spaced appliances as illustrated in FIG. 9. In each of these applications, a pair of the conductive corner tabs 11-14 is located at opposite ends of the bottom surface of the housing 10 where water is to be detected.

To exclude moisture and corrosive agents, the housing 10 is preferably filled with a potting compound after the housing and its internal parts (described below) have been assembled. Conventional potting compounds, such as thermosetting plastics or silicone rubber, gels may be used.

Figure 12:
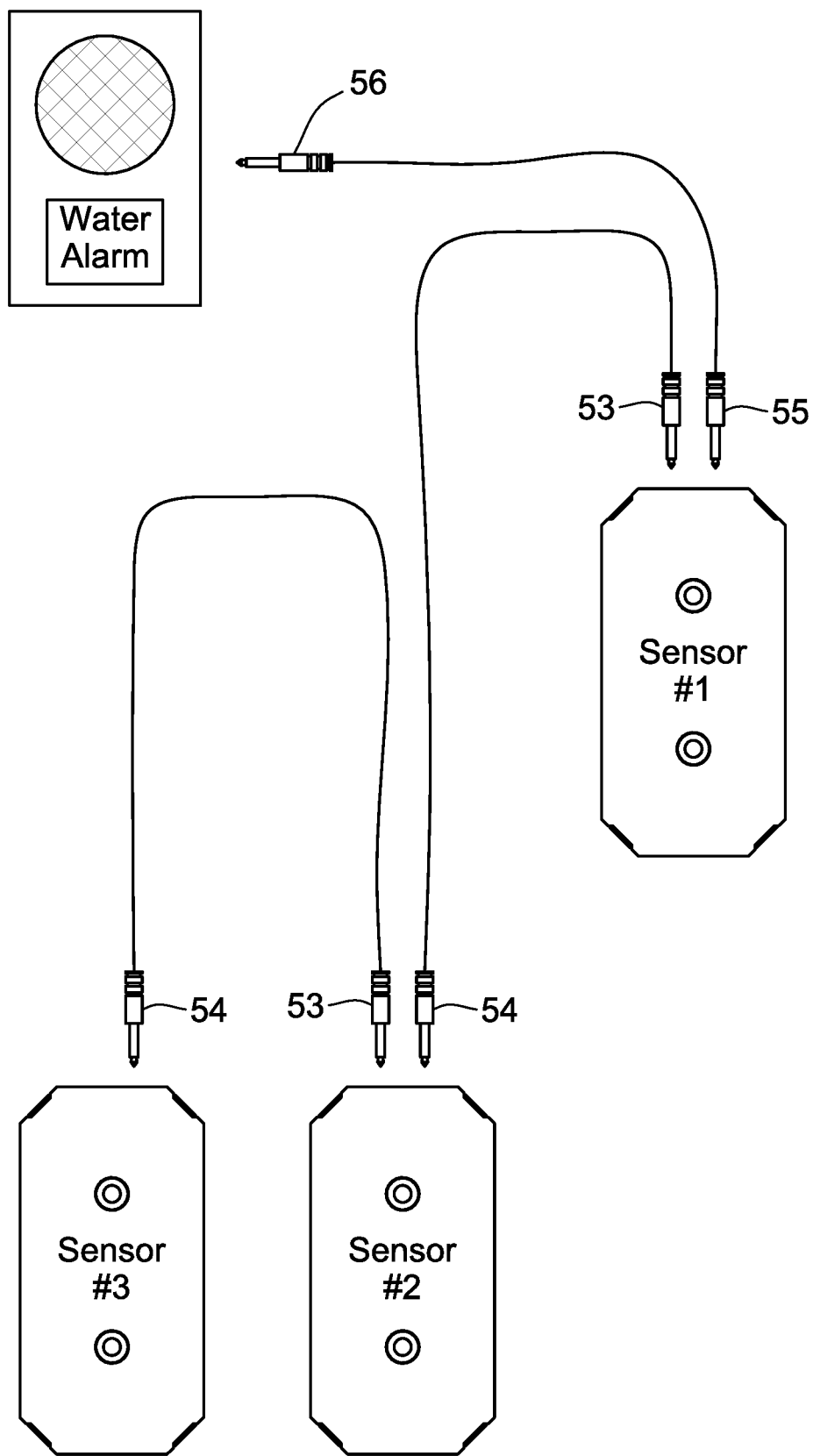
FIG. 12 is a schematic diagram of a single water alarm coupled to a chain of water sensors of the type illustrated in FIGS. 10 and 11.

FIGS. 10-12 illustrate a modified arrangement for replacing the cable 15 on the sensor with a dual female socket 40, such as a dual 3.5 mm female socket. Alternately, instead of a dual female socket, one or more individual female sockets can be present. The socket 40 receives a pair of cables 41a and 41b, each of which has a pair of 3.5-mm male jacks 53, 54 or 55, 56 at opposite ends for connecting that cable to corresponding 3.5-millimeter female sockets. For example, FIG. 12 illustrates one cable used to connect the sensor to a compatible device such as the water alarm described above, while the other cable is used to connect the sensor to one or more additional sensors in a chain. When any of the sensors comes into contact with water, the connected water alarm will sound an alarm. This allows the use of a single water alarm to be used with multiple sensors, e.g., for cost reduction.

FIGS. 13-16 illustrate a multi-directional water sensor with a generally rectangular housing 60 with four truncated corners, each of which includes one of four electrically conductive pads 61-64. Similar to the housing 10 of FIGS. 1-5, the main body portion of the housing 60 is made of non-conductive material with predetermined outer dimensions. For example, the outer dimensions of the housing can measure about 3.5 inches by 2 inches by 0.8 inches. The conductive pads 61-64 are similar to the conductive pads 11-14 of FIGS. 1-5 such that when water contacts any two groupings of the conductive pads 61-64, an electrical circuit is completed.

The housing 60 has an opening 65. The opening 65 is depicted as a rectangular shaped opening surrounded by four sidewalls with three of those sidewalls identified as 78a, 78b and 78c. In an embodiment, when the housing 60 is positioned on a surface perpendicular to all four sidewalls of the opening 65, each of the four sidewalls abuts the surface that the housing 60 is positioned on, and the surface acts as a bottom wall for the opening 65. The sidewall 78c includes an opening for a buzzer 66 so that when any two groupings of the conductive pads 61-64 comes in contact with water, the buzzer 66 produces sound within the opening 65. The four sidewalls and the surface on which the housing 60 is positioned reflect the sound within the opening 65, thus amplifying the sound from the buzzer 66. The four sidewalls and the surface on which the housing 60 is positioned thus produce a well at the opening 65 for amplifying sound from the buzzer 66. When the housing 60 is positioned to produce the well, the sound from the buzzer 66 bounces along the four sidewalls and the surface on which the housing 60 is positioned and only has one path to escape.

The housing 60 further includes a battery compartment 77 for receiving a battery 69. The battery compartment 77 is a cavity located inside the housing 60, and access to the battery compartment 77 is obtained by removing a cover 75 from the housing 60. In an embodiment, the cover 75 is secured to the housing 60 via screws 76a and 76b. Other methods of securing the cover 75 to the housing 60 can be employed, e.g., by using fasteners, glues, or other sealants. The battery compartment 77 can be made waterproof by including a gasket 74 or some other type of sealant to prevent fluid, such as water, from entering the battery compartment 77 through the boundaries between the cover 75 and the housing 60 when the cover 75 is affixed to the housing 60. In some embodiments, the battery door or the cover 75 can be positioned on any of the exterior walls of the housing and the battery 69 can be oriented in a different direction than shown in FIGS. 13-16.

Figure 13:
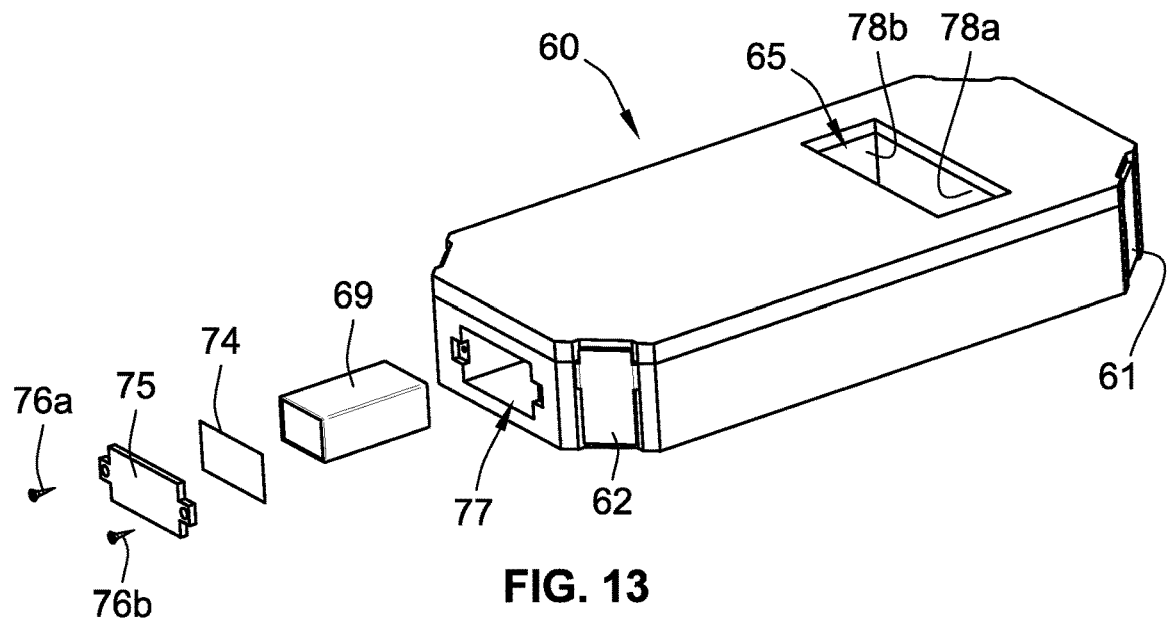
FIG. 13 is a top perspective view from one corner of a water sensor illustrating a battery compartment, according to an embodiment of the disclosure.
Figure 14:
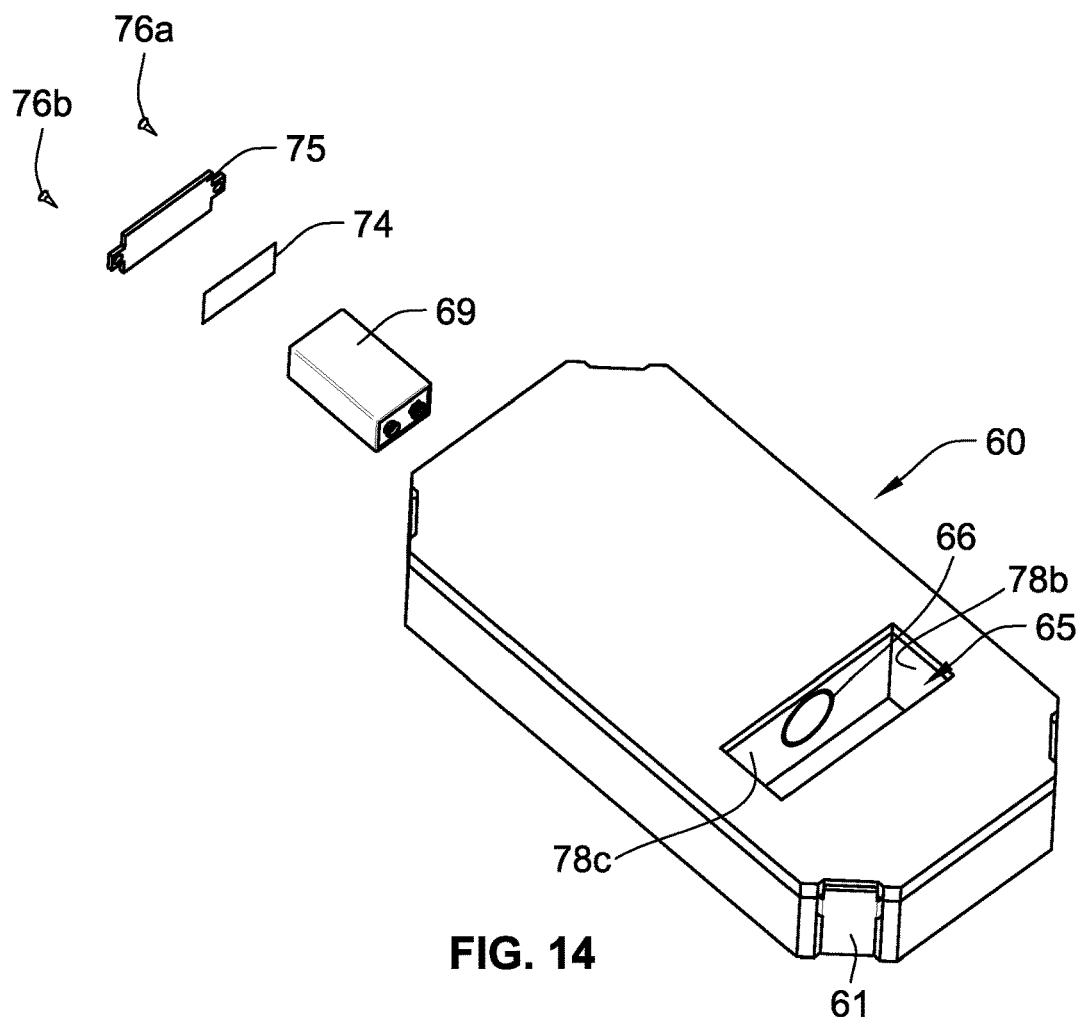
FIG. 14 is a top perspective view from another corner of the water sensor of FIG. 13.
Figure 15:
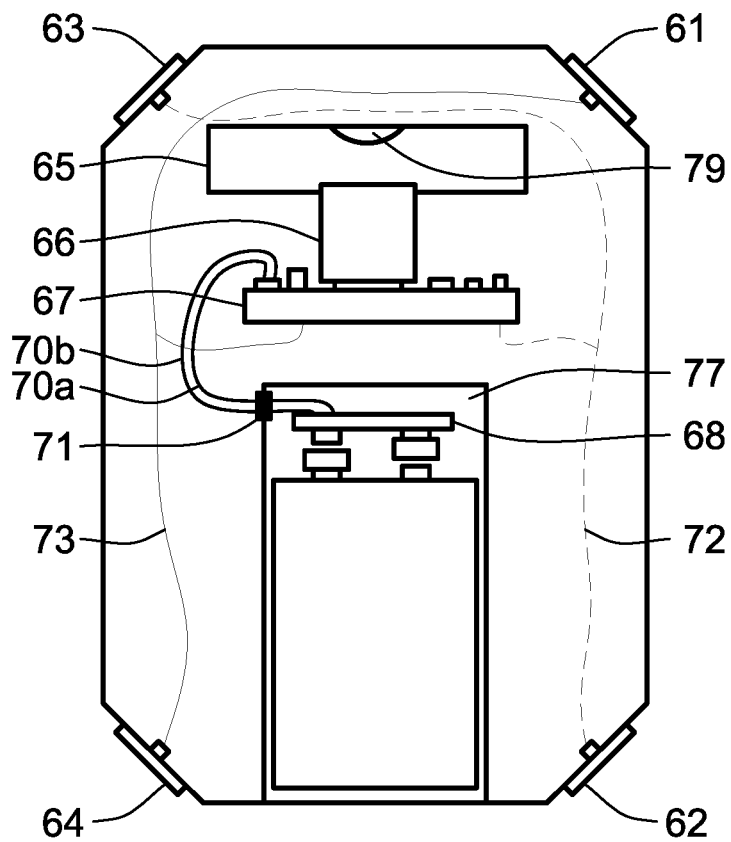
FIG. 15 is a top transparent view of the water sensor of FIG. 13 illustrating an arrangement of components internal to the water sensor, according to an embodiment of the disclosure.
Figure 16:
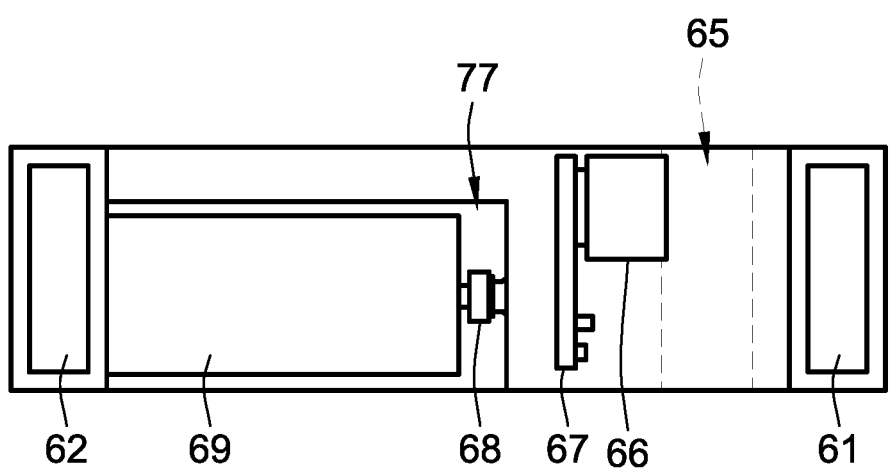
FIG. 16 is a side transparent view of the water sensor of FIG. 13 illustrating the arrangement of components as depicted in FIG. 15.

FIG. 15 is a top transparent view of the water sensor of FIG. 13 illustrating an arrangement of components internal to the water sensor, according to an embodiment of the disclosure. FIG. 16 is a side transparent view of the water sensor of FIG. 13. In an embodiment, a protrusion 79 (shown in FIG. 15) is provided on one of the sidewalls of the opening 65 across from the buzzer 66. The protrusion 79 further aides in amplifying sound that bounces from the sidewall 78a. Although in FIG. 15 the protrusion 79 is shown on a sidewall opposite the buzzer 66, in other embodiments, the protrusion 79 can be placed on one or both sidewalls adjacent to the buzzer 66, or multiple protrusions like protrusion 79 can be arranged on multiple sidewalls that surround the buzzer 66. The battery compartment 77 houses battery 69 which can be a 9V battery. The battery compartment 77 also houses a battery connector 68 with electrical wires 70a and 70b for connecting the battery 69 to a circuit board 67. The battery 69 can thus provide power to electrical components on the circuit board 67 and the buzzer 66. In an embodiment, a sealant 71 holds the wires 70a and 70b in place. In an embodiment, the battery connector 68 is attached to a sidewall in battery compartment 77 that is parallel to the cover 75. The weight of the battery 69 can also bias the water sensor so that it has a tendency due to gravity and the bottom-heavy preference of the battery position so that a bottom surface 100 of the water sensor rests on the surface on which water is to be detected. Even though the water sensor is capable of detecting the presence of water on a surface in any orientation, if the water sensor, for example, is tossed onto the surface, the weight and position of the battery will most likely cause the water sensor to orient the bottom surface 100 toward the surface on which the water sensor rests. This is also the most stable position for the water sensor. Even if the water sensor is originally oriented to rest on one of its narrow edges and then tips over so that its bottom surface 100 now faces the ground surface, the water sensor will still be able to detect the presence of water on that ground surface.

The circuit board 67 can be a printed circuit board having electrical components, such as logic gates, microcontrollers, resistors, capacitors, inductors, transformers, and so on. The buzzer 66 is soldered to the circuit board 67 to electrically connect the buzzer to the electrical components of the circuit board 67. Wires 72 and 73 connect the conductive pads 61-64 in pairs, analogous to wires 41 and 42 of FIGS. 4A and 4B. Wires 72 and 73 further connect to the circuit board 67 such that when water is present both wires 72 and 73 will be electrically connected.

Figure 17:
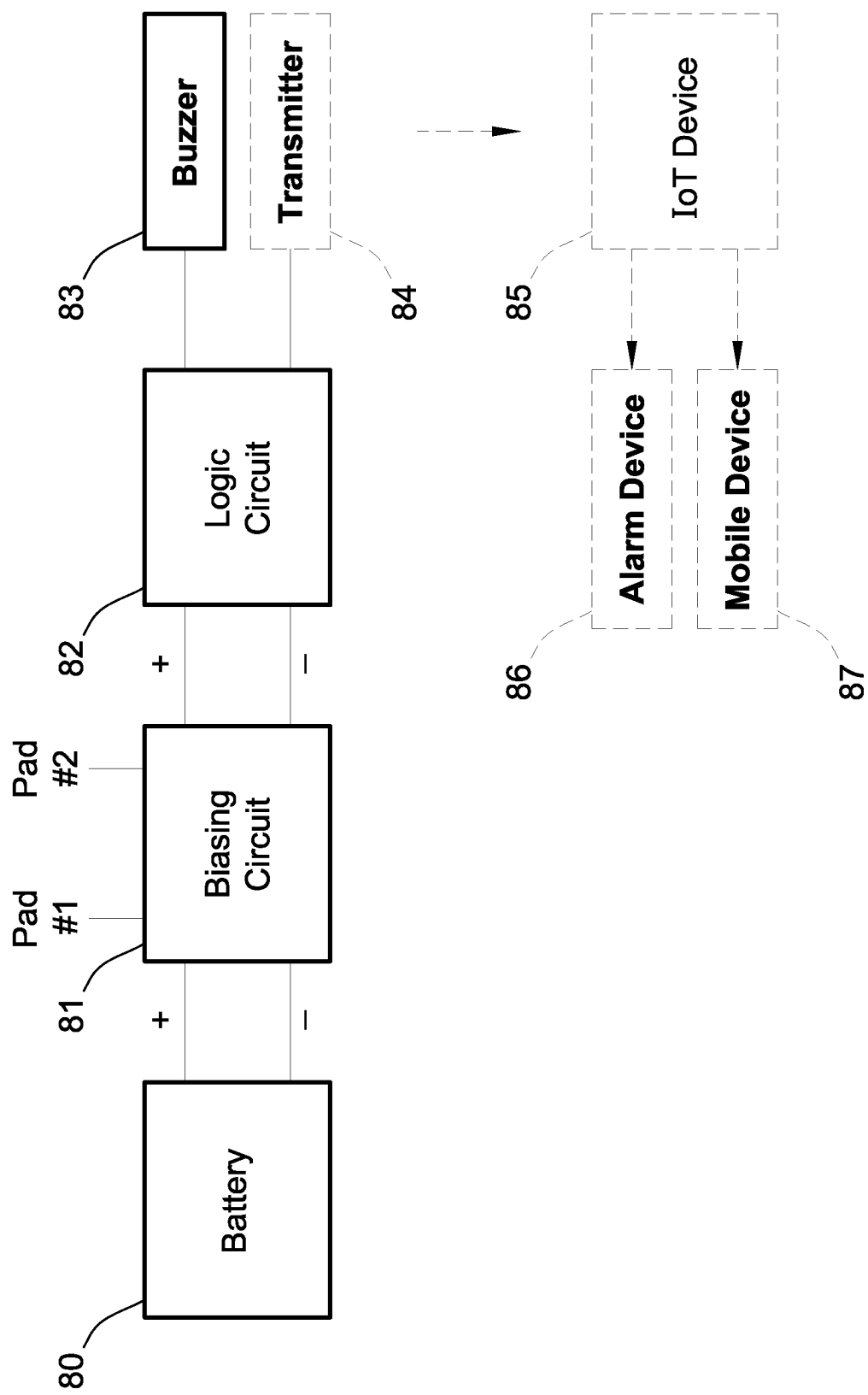
FIG. 17 illustrates electronic components for water sensing according to an embodiment of the disclosure.

FIG. 17 illustrates electronic components for water sensing according to an embodiment of the disclosure. In the context of FIGS. 15-16, a battery 80 can reside in the battery compartment 77 providing power to the circuit board 67 via wires 70a and 70b. A biasing circuit 81, a logic circuit 82, a buzzer 83, and optionally, a transmitter 84 can be soldered to the circuit board 67. The biasing circuit 81 is a voltage regulator that receives power from the battery 80 and provides a stable direct current (DC) voltage to other components on the circuit board 67. In an embodiment, the biasing circuit 81 provides power to the logic circuit 82 which in turn causes the buzzer 83 to generate a sound and also causes the transmitter 84 to generate an alert signal that can be sent to an internet of things (IoT) device 85. The IoT device 85 can be a remote receiver that relays or pushes the alert signal to an alarm device 86 or a mobile device 87. The alarm device 86 can be the water alarm in FIG. 12 reconfigured to generate sound based on receiving wireless alert signals. The mobile device 87 can be a smartphone, a laptop, a beeper, and so on, which is configured to receive a push notification indicative of the alert signal.

In an embodiment, the biasing circuit 81 draws no power from the battery 80 if no water is detected by the water sensor. The biasing circuit 81 monitors two groupings of conductive pads, denoted in FIG. 17 as pad1 and pad2. A grouping of conductive pads indicates conductive pads that are connected to each other. For example, in FIG. 15, conductive pads 62 and 63 are in a first grouping connected via wire 72, and conductive pads 61 and 64 are in a second grouping connected via wire 73. Water is detected when the biasing circuit 81 determines that the first grouping is connected to the second grouping, that is, that pad1 is connected to pad2. When the biasing circuit 81 detects water, then the biasing circuit 81 starts drawing power from the battery 80 and begins providing power to the logic circuit 82. In this way, the operational lifetime of the water sensor is limited only by the lifetime of the battery if no water is detected. The water sensor according to embodiments herein is completely self-contained with its own sensors, power source, and sound generating apparatus to detect the presence of a thin layer of water regardless of how the water sensor is oriented on the ground surface where water is to be detected. The water sensor has a long shelf life and can sit for years without drawing any power until water is detected.

In an embodiment, the logic circuit 82 is a driver for the buzzer 83 such that once the biasing circuit 81 provides power to the logic circuit 82, the logic circuit 82 drives the buzzer 83 to generate a sound. In an embodiment, the buzzer 83 is a piezoelectric buzzer. In some embodiments, the sound energy emitted by the buzzer can cause the housing of the water sensor to vibrate and jostle haphazardly against the ground surface, further adding to the overall sound effect produced by the water sensor. The term buzzer herein refers to any sound generating apparatus configured to generate a sound, such as a piercing sound or alarm, which is audible by the human ear.

Figure 18:
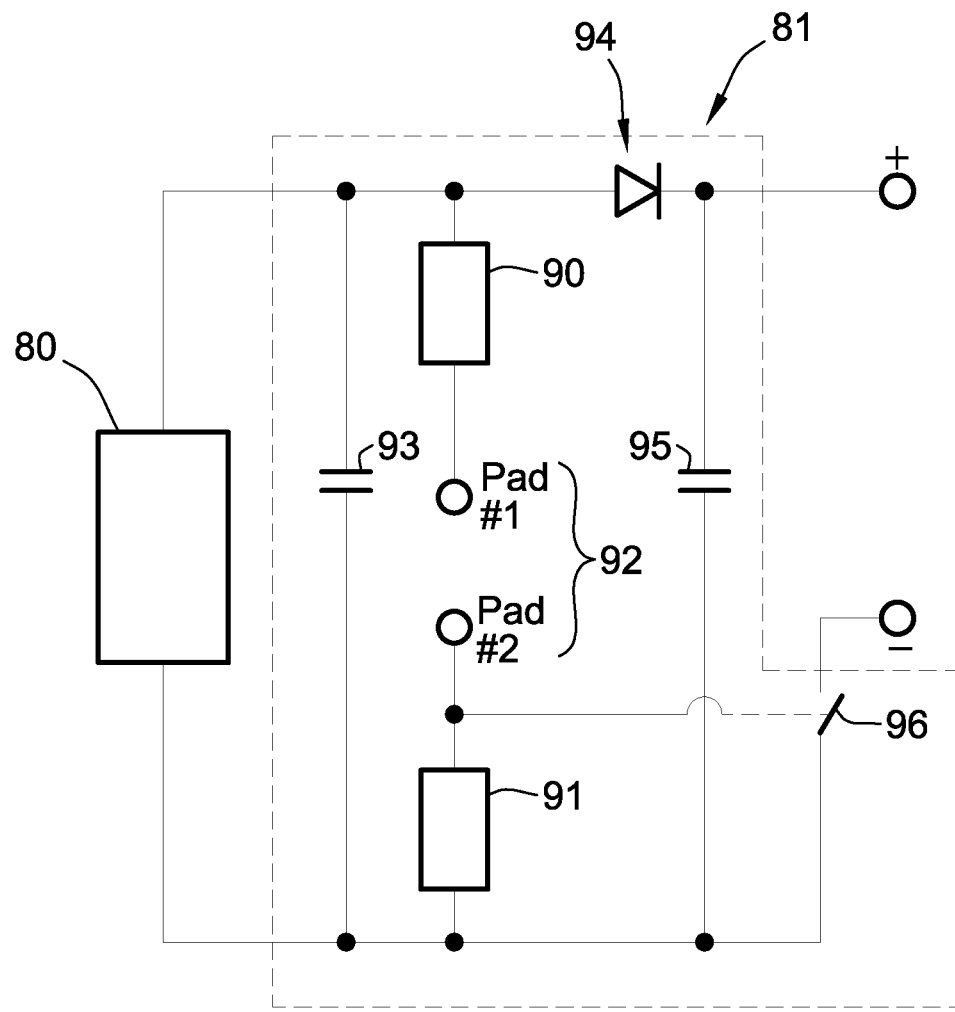
FIG. 18 illustrates a biasing circuit for a water sensor according to an embodiment of the disclosure.

FIG. 18 illustrates a biasing circuit for a water sensor according to an embodiment of the disclosure. The biasing circuit 81 can include a capacitor 93 for stabilizing input voltage from the battery 80, a diode 94 for preventing feedback current flow from downstream electronic components, and a capacitor 95 for stabilizing voltage provided to downstream components. The biasing circuit 81 can also include an incomplete voltage division ladder indicated as components 90, 91, and 92. Components 90 and 91 can be resistors, and in some embodiments, capacitors. Component 92 is an open circuit when pad1 is not connected to pad2, hence has a high resistance or an open circuit resistance. Component 92 can be modeled as a low resistance when pad1 becomes connected to pad2 via a thin layer of surface water connecting pad1 to pad2. Thus, in the absence of water, no current flows in the voltage division ladder because pad1 and pad2 are not connected, but when water is present, it creates an electrical path between pad1 and pad2, allowing current to flow through the voltage division ladder.

Once power is provided to the voltage division ladder, component 91 will have a voltage drop across its terminals which can be used to toggle a switch 96 to power downstream electronic components. The switch 96 can be a field effect transistor (FET).

Figure 19:
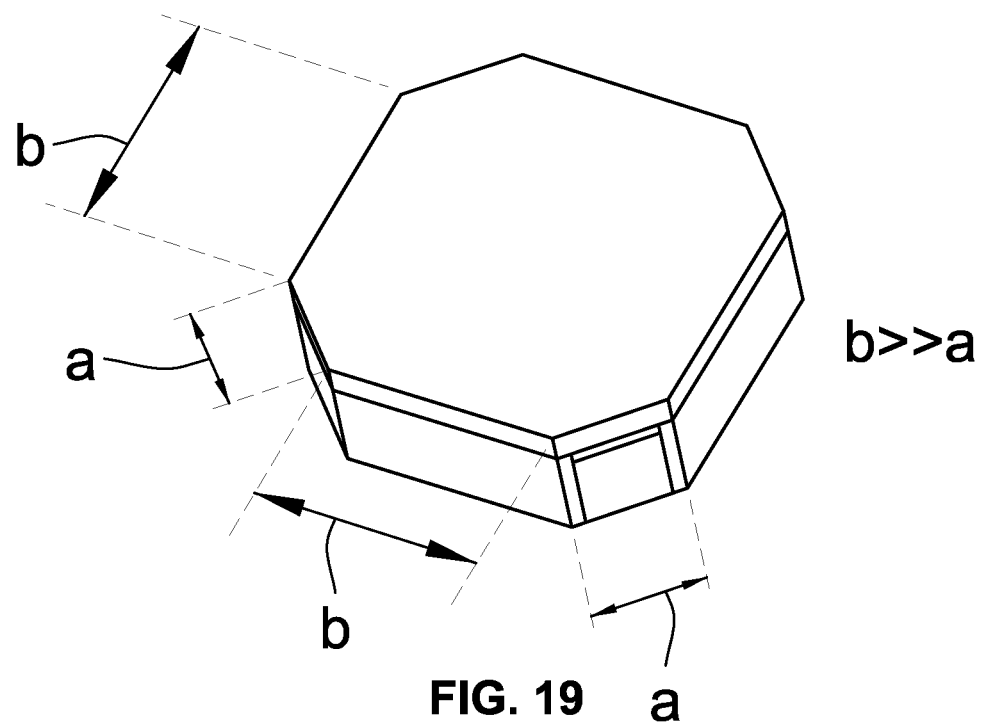
FIG. 19 illustrates a square form factor for a water sensor according to an embodiment of the disclosure.
Figure 20:
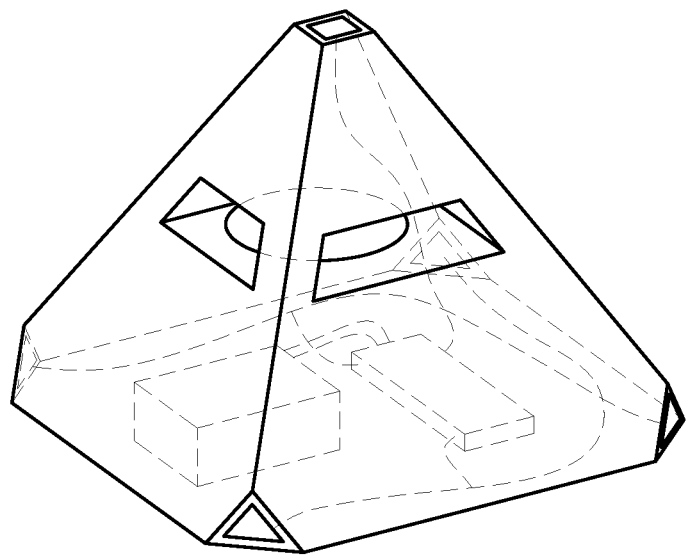
FIG. 20 illustrates a pyramid form factor for a water sensor according to an embodiment of the disclosure.
Figure 21:
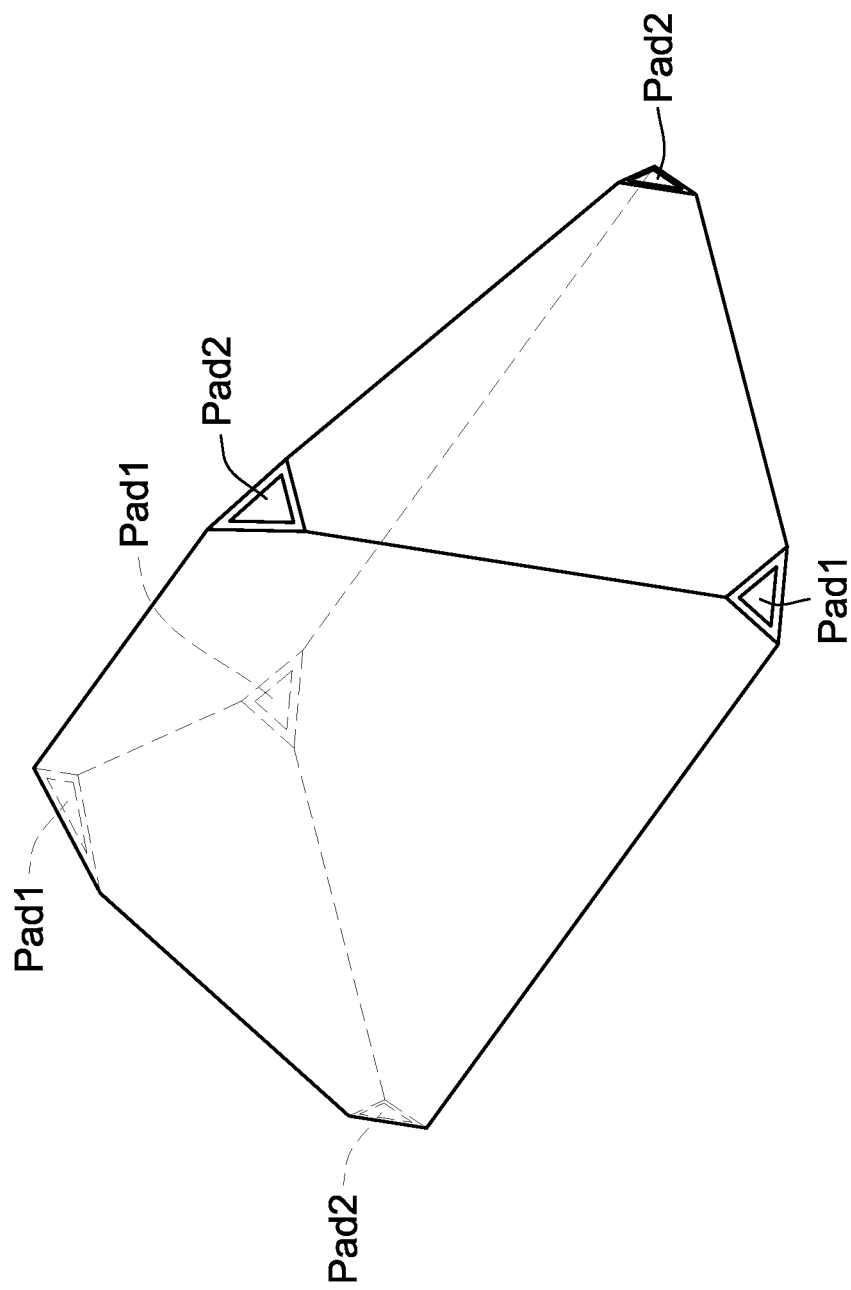
FIG. 21 illustrates a prism form factor for a water sensor according to an embodiment of the disclosure.

FIGS. 19-21 depict various form factors for water sensors according to embodiments of the disclosure. FIGS. 1 and 13 depict generally rectangular housings, but FIG. 19 depicts a generally square housing. Similar to the rectangular housings, the corners of the cross-sectional square are locations where the conductive pads reside. The generally square housing allows the water sensor to sit on any of its surfaces similar to arrangements shown in FIGS. 7-9. The present disclosure contemplates any form factor of the water sensor in which the form factor is capable of detecting water relative to two or three or four or five or six or more distinct surfaces of the water sensor. Each of the distinct surfaces have two exposed conductors that form an open circuit therebetween until a thin layer of water completes the circuit between the two exposed conductors, which causes an alarm to sound.

FIG. 20 illustrates a pyramid form factor where corners of the pyramid are reserved as locations for the conductive pads to reside. FIG. 21 illustrates a second polyhedron form factor where corners of a prism are identified as locations for conductive pads to reside. Shape of the conductive pads take on the shape of its truncated corners. For example, the truncated apex of the pyramid has a rectangular shape, thus its conductive pad is rectangular in nature while for the other corners, their conductive pads are triangular in nature. That way, water can be sensed by the water sensor when placed on any face of the pyramid. The rectangular conductive pad at the apex can be grouped together with one of the groups of the triangular conductive pads. The prism in FIG. 21 illustrates an example connection for the different pads at the truncated corners.

Some embodiments of the disclosure can be combined to realize other functionality. For example, chaining of water sensors as shown in FIG. 12 can be accomplished using wireless transmitters. 3.5 mm jacks can be provided in the water sensor of FIG. 13 to realize a chaining similar to that of FIG. 12 where one of the water sensors in FIG. 12 is replaced with a water sensor of FIG. 13 outfitted with 3.5 mm jacks. That way, the water alarm provided can be avoided, and the water sensor of FIG. 13 uses its buzzer to sound an alarm when any one of the connected water sensors sense the thin layer of surface water.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:

1. A multi-directional water sensor comprising:
a housing including an outer surface, the outer surface including multiple conductive pads spaced about the outer surface of the housing, the multiple conductive pads including a first grouping of conductive pads and a second grouping of conductive pads, the first grouping including a first conductive pad and a second conductive pad, the second grouping including a third conductive pad and a fourth conductive pad;
an electrical power source located inside the housing;
multiple electrical conductors located inside the housing and including (a) a first electrical conductor connected between the first conductive pad and a second conductive pad and (b) a second electrical conductor connected between the third conductive pad and the fourth conductive pad, such that any pad of the first grouping is electrically connected to any pad of the second grouping in the presence of a very thin layer of surface water therebetween; and
a buzzer located inside the housing and coupled to the electrical power source, the buzzer being configured to generate a sound in response to any pad of the first grouping being electrically connected to any pad of the second grouping via the very thin layer of surface water.

2. The water sensor of claim 1, wherein the housing has a generally rectangular or square or pyramid shape and the very thin layer of surface water has a minimum height of 1/32" above an exterior surface upon which the housing rests.

3. The water sensor of claim 1, wherein:
the multiple conductive pads include a third grouping of conductive pads including a fifth and any of the first, second, third, or fourth conductive pads conductive pad.

4. The water sensor of claim 1 wherein the housing is waterproof.

5. The water sensor of claim 4, further comprising:
a cover for a battery compartment located inside the housing, the cover being a removable part of the outer surface of the housing; and
a gasket located within the housing and sealing a spacing between the battery compartment and the cover for the battery compartment, wherein the electrical power source is a battery located in the battery compartment.

6. The water sensor of claim 4, wherein the buzzer is positioned relative to the housing so that the buzzer is exposed to an environment of the waterproof housing.

7. The water sensor of claim 6, wherein the housing encloses an opening having walls, the buzzer being positioned along a first of the walls such that the sound generated by the buzzer impacts a second of the walls opposing the first of the walls to amplify the sound.

8. The water sensor of claim 1, further comprising:
a biasing circuit electrically coupled between the electrical power source and the buzzer, the biasing circuit configured to provide power to the buzzer in response to the any pad of the first grouping being electrically connected to any pad of the second grouping via the very thin layer of surface water.

9. The water sensor of claim 8, wherein:
the biasing circuit draws no power from the electrical power source when no pad of the first grouping is electrically connected to any pad of the second grouping via the very thin layer of surface water.

10. The water sensor of claim 1, further comprising:
a transmitter coupled to the electrical power source and configured to send an alert signal to a remote receiver in response to the any pad of the first grouping being electrically connected to any pad of the second grouping via the very thin layer of surface water.

11. The water sensor of claim 10, wherein in response to the transmitter sending the alert signal, the remote receiver being configured to cause a push notification indicative of the alert signal to be communicated to a wireless communication device.

12. The water sensor of claim 1, wherein the outer surface of the housing includes at least four peripheral surfaces, each of which includes multiple exposed electrically conductive pads such that regardless of which of the four outer surfaces of the housing contacts an external surface over which the surface water can be present, at least two of the conductive pads are oriented relative to the external surface so that an electrical circuit is completed in the presence of the very thin layer of surface water.

13. The water sensor of claim 12, wherein the housing has a generally rectangular, square, or pyramid shape.

14. A method for sensing water comprising:
monitoring, by a biasing circuit of a multi-directional water sensor, a resistance between at least two distinct groupings of multiple conductive pads, the multiple conductive pads including a first conductive pad, a second conductive pad, a third conductive pad, and a fourth conductive pad, the at least two distinct groupings including a first grouping of conductive pads and a second grouping of conductive pads, the first grouping including a first conductive pad and a second conductive pad, the second grouping including a third conductive pad and a fourth conductive pad, wherein the multiple conductive pads are spaced around an outer surface of a housing of the multi-directional water sensor such that a low resistance is sensed when any pad of the first grouping and any pad of the second grouping are electrically connected by a very thin layer of surface water and a high resistance is sensed when no pad of the first grouping is connected to any pad of the second grouping by the very thin layer of surface water;

configuring the biasing circuit of a multi-directional water sensor such that no power is drawn from an electrical power source of the multi-directional water sensor while the high resistance is sensed; and providing, by the biasing circuit of the multi-directional water sensor, power to a buzzer of the multi-directional water sensor in response to determining that the low resistance exists.

15. The method of claim 14, wherein the housing has a generally rectangular or square or pyramid shape and the very thin layer of surface water has a minimum height of 1/32" above an exterior surface upon which the housing rests.

16. The method of claim 14, further comprising:
providing, by the biasing circuit of the multi-directional water sensor, power to a transmitter of the multi-directional water sensor in response to determining that the low resistance exists.

17. The method of claim 16, further comprising:
sending, by the transmitter of the multi-directional water sensor, an alert signal to a remote receiver when the low resistance exists.

18. The method of claim 17, wherein the alert signal sent to the remote receiver causes a push notification indicative of the alert signal to be communicated via the remote receiver to a wireless communication device.

19. The method of claim 14, further comprising:
generating, by the buzzer, a sound when powered by the biasing circuit of the multi-directional water sensor.

20. The method of claim 19, further comprising:
reflecting, by at least one wall of an enclosed opening of the housing, the sound generated by the buzzer to amplify the sound within the enclosed opening of the housing.

* * * * *